United States Patent Office 3,215,553
Patented Nov. 2, 1965

3,215,553
PROCESS OF IMPARTING STAIN RESISTANCE TO HEAT AND PRESSURE CONSOLIDATED AMINOPLAST RESINOUS ARTICLE
Aleksandra C. Nawakowski, Glenbrook, and Lennart A. Lundberg, Stamford, Conn., assignors to American Cyanamid Company, Stamford, Conn., a corporation of Maine
No Drawing. Filed Dec. 17, 1962, Ser. No. 244,884
13 Claims. (Cl. 117—63)

This invention relates to novel methods of imparting resistance to staining, and particularly to staining caused by coffee and tea, to heat- and pressure-consolidated articles manufactured from thermosetting aminoplast resins, such as melamine-formaldehyde resins. This invention further relates to stain-resistant, heat- and pressure-consolidated, thermoset aminoplast resin-containing articles, such as molded or laminated melamine-formaldehyde articles, prepared according to our novel methods, as well as to the stain-retarding compositions used to impart stain-resistance to said articles.

The many excellent properties possessed by thermosetting aminoplast resins, and in particular by aminotriazine-aldehyde resins such as melamine-formaldehyde resins, have led to their widespread use in the molding and laminating fields. More particularly, the thermosetting or heat-hardenable resins possess, in the cured or thermoset state, superior break-resistance, resistance to water and other solvents, to softening or other internal heat-failures, to cracking when exposed to electrical stress, and to surface failures such as loss of gloss, discoloration or crazing due to heat and light, all of which features render them especially suitable for the preparation of heat- and pressure-consolidated molded and laminated articles.

However, laminated table, counter and bar tops, molded cups, saucers, plates, and the like prepared from conventional thermosetting aminoplast resins such as melamine-formaldehyde resins do possess one deficiency which detracts from their overall excellence, in that they are susceptible to various kinds of stains. Coffee and tea are among the worst offenders in this respect, but other substances, and especially acidic substances, for example, the juices of various fruits and vegetables, such as raspberry, grape, and beet juices, to mention just a few, soft drinks (e.g., cola drinks), cocoa, and the like, also leave stains which detract from the appearance, although not the durability, of such articles, and which are difficult to remove even if attended to immediately.

This propensity of conventionally prepared heat- and pressure-consolidated aminoplast resin articles for staining has limited, in many cases, the extent to which such articles have found acceptance in many important areas of everyday use. For example many people, and especially restaurateurs and other large-volume users of dinnerware, have been reluctant to replace chinaware with high-quality tableware made from thermosetting melamine-formaldehyde resinous compositions, despite the latter's many obviously superior properties.

We have now discovered that marked resistance to staining, particularly to staining caused by acidic substances such as coffee and tea, can be imparted to heat- and pressure-consolidated articles manufactured from thermosetting aminoplast resins such as melamine-formaldehyde resins by a procedure which in essence involves:

(1) Coating the surfaces to be protected in said articles, i.e., all or part of the total surface area, with a stain-retarding composition comprising a liquid polyester resin prepared by reacting a cycloaliphatic tetracarboxylic acid or anhydride with a polyhydric alcohol containing at least two hydroxyl groups, for example a polyester resin prepared by reacting a cyclopentanetetracarboxylic acid or anhydride with pentaerythritol, (2) Heat-treating the thus-coated article to convert the polyester resin coating on the surface of the article to a tack-free film, and (3) Washing the heat-treated article to remove the nonadhering portion of said polyester resin film.

It is, therefore, an object of our invention to provide novel heat- and pressure-consolidated articles manufactured from thermosetting aminoplast resins, and particularly from melamine-formaldehyde resins, which are resistant to staining by common foods and beverages.

It is also an object of our invention to provide novel methods of imparting stain-resistance to heat- and pressure-consolidated articles manufactured from thermosetting aminoplast resins, and particularly from melamine-formaldehyde resins.

A further object of our invention is to provide stain-retarding compositions of matter useful in imparting stain-resistance to heat- and pressure-consolidated articles manufactured from thermosetting aminoplast resins, and particularly from melamine-formaldehyde resins.

These and other objects of our invention will be discussed more fully hereinbelow.

The cycloaliphatic tetracarboxylic acids which can be used in preparing the stain-retarding compositions employed in the practice of the present invention include those compounds wherein the cycloaliphatic ring contains from 4 to 6 carbon atoms, inclusive, such as 1,2,3,4-cyclobutanetetracarboxylic acid, 1,2,3,4-cyclopentanetetracarboxylic acid, 1,2,3,4-cyclohexanetetracarboxylic acid, 1,2,3,5-cyclohexanetetracarboxylic acid, 1,2,4,5-cyclohexanetetracarboxylic acid, and the like, and mixtures thereof, as well as the corresponding mono- and dianhydrides of said acids. The cyclopentanetetracarboxylic acids and anhydrides, and especially 1,2,3,4-cyclopentanetetracorboxylic acid and its mono- and dianhydrides, constitute a preferred class of cycloaliphatic tetracarboxylic acids and anhydrides useful in practicing the present invention.

The carboxyl or anhydride groups in these cycloaliphatic tetracarboxylic acids and anhydrides can have a plurality of isometric configurations. For instance, we can employ cis,cis,cis,cis-tetracarboxylic acids, cis,cis,cis,-trans-tetracarboxylic acids, cis,trans,cis,trans-tetracarboxylic acids or cis,trans,trans,cis - tetracarboxylic acids. Similarly, as an illustration in the case of anhydrides, a monoanhydride can be formed from a 1,2,3,4-cycloaliphatic tetracarboxylic acid having one pair of adjacent carboxyl groups cis to one another, with the remaining carboxyl groups either cis or trans to one another or cis or trans to the anhydride group, while in the dianhydride of a 1,2,3,4-cycloaliphatic tetracarboxylic acid each of the carboxyl groups in the pairs of carboxyl groups that are dehydrated to form the anhydride groups will be cis to one another, although the two anhydride groups themselves may be either cis or trans to one another.

The polyhydric alcohols containing at least two hydroxyl groups, and preferably from 2 to 6 hydroxyl groups, inclusive, which can be reacted with the aforementioned cycloaliphatic tetracarboxylic acids and anhydrides to provide the polyester resins used in practicing the present invention include saturated aliphatic polyols such as ethylene glycol, polyethylene glycols, such as diethylene glycol, triethylene glycol, tetraethylene glycol, and the like, propylene glycol, polypropylene glycols, such as dipropylene glycol, tripropylene glycol, and the like, butanediol-1,2, butanediol-1,3, butanediol-1,4, pentanediol-1,2, pentanediol-1-3, pentanediol-1,4, pentanediol-1,5, hexanediol-1,2, hexanediol-1,3, hexanediol-1,4, hexanediol-1,5, hexanediol-1,6, glycerol, pentaerythritol, dipentaerythritol, arabitol, xylitol, dulcitol, adonitol, sorbital, mannitol, methylol diethylolethane, trimethylolmethane, trimethylolpropane, triethanolamine, and the like, as well as mixtures thereof. Saturated aliphatic tetrols, and especially pentaerythritol, constitute a preferred class of polyhydric alcohols useful in practicing the present invention.

The esterification mixtures comprising a cycloaliphatic tetracarboxylic acid or anhydride and a polyhydric alcohol containing two or more hydroxyl groups from which the stain retarding polyester resins of the present invention are prepared generally will be formulated so as to contain at least a stoichiometric balance between carboxyl and hydroxyl groups. For example, where saturated aliphatic tetrols, such as pentaerythritol, are reacted with the cycloaliphatic tetracarboxylic acid or anhydride, they are usually reacted on at least a mol-for-mol basis. However, either the cycloaliphatic tetracarboxylic acid or the polyhydric alcohol can be employed in amounts up to about 50% in excess of the stoichiometric quantity required for complete esterification, with the use of excess amounts of the cycloaliphatic tetracarboxylic acid being preferred.

The particular cycloaliphatic tetracarboxylic acid or anhydride and polyhydric alcohol used are preferably reacted in the manner customarily employed in the art when preparing polyester resins, i.e., at elevated temperatures and atmospheric pressure. Whenever necessary, for example when reacting a cycloaliphatic tetracarboxylic acid or anhydride with pentaerythritol, sufficient water will be added to the reactants to render the reaction mixture substantially homogeneous, thereby facilitating the reaction. In general, the amount of water necessary to effect substantial homogeneity will be such that the initial concentration of the reactants in the resulting reaction mixture can range from about 25% to about 70% by weight, and preferably from about 50% by weight to about 65% by weight, based on the total weight of the reaction mixture. In those cases where the cycloaliphatic tetracarboxylic acid or anhydride and the polyhydric alcohol are mutually soluble, and thus provide a substantially homogeneous reaction mixture by themselves, no water need be added.

The temperature at which this reaction is carried out is not critical. Thus, the reaction will preferably be carried out at a temperature which usually will be just below the boiling point of the most volatile component of the reaction mixture, which is generally the polyol. However, temperatures in excess of the boiling point of the most volatile component may be employed if the reaction vessel is equipped with suitable condensing means, such as a steam-heated reflux condenser, which will permit water of esterification to escape from the reaction vessel while condensing volatilized reaction components and returning them to the reaction sphere. Similarly, pressures slightly above or below atmospheric pressure may be employed if desired.

Since resinifying reactants of this type are prone to develop undesirable color when in contact with air at elevated temperatures, it is desirable to conduct the esterification reaction in an inert atmosphere, such as can be obtained by bubbling an inert gas, e.g., carbon dioxide, nitrogen, and the like, through the esterification mixture.

Essentially, the reaction condtions which can be employed in preparing the stain-retarding polyesters of the present invention are critical only in the sense that they will be chosen so as to ultimately produce an ungelled, liquid polyester resin having an acid number ranging from about 100 to about 350 and preferably from about 225 to about 300. The determination of the acid number of the reaction mixture is an art-recognized means of determining and controlling the degree of esterification or condensation that occurs in the reaction mixture, and comprises ascertaining the milligrams of potassium hydroxide necessary to neutralize one gram of the reaction mixture.

After reacting the cycloaliphatic tetracarboxylic acid or anhydride and the polyhydric alcohol to the appropriate acid number, using conventional reaction conditions as outlined above, the resulting polyester resin will be obtained as an aqueous solution. This solution can then be used as such to treat heat- and pressure-consolidated aminoplast resin articles. On the other hand, the polyester resin can, if desired, be used in solution in an inert organic solvent, preferably a water-miscible, polar solvent having a boiling point at atmospheric pressure above about 50° C., such as acetone, acetonyl acetone, tetrahydrofuran, dioxane, formamide, dimethylformamide, diethylformamide, acetonitrile, propionitrile, ethyl sulfoxide, dimethyl sulfoxide, methyl Cellosolve (ethylene glycol monomethyl ether acetate), carbitol acetate (diethylene glycol monoethyl ether acetate), diethyl carbitol (diethylene glycol diethyl ether), and the like, as well as mixtures thereof.

In preparing a solution of the polyester resin in an inert organic solvent, all or substantially all of the water present will first be removed from the aqueous polyester resin solution, using any means which will not substantially advance the resin towards the gel state, e.g., vacuum distillation at low temperatures, such as room temperature or slightly above, and the resulting dehydrated resin will then be dissolved in the inert organic solvent. Of course, mixtures of water and a water-miscible inert organic solvent can also be employed, in which case no dehydration or only partial dehydration need be accomplished.

Whether water, an inert organic solvent or a mixture thereof is present, the relative amounts of solvent and polyester resin used can be varied over a wide range, depending first of all on the method employed in applying the composition to the surface of the heat- and pressure-consolidated aminoplast resin article being treated. For instance, if the composition is to be applied using a doctor knife or similar spreading means, relatively viscous solutions will be prepared. In such a case, relatively smaller amounts of solvent are needed. If, on the other hand, the composition is to be applied by spraying, by brush or roller coating, or by dipping the article therein, larger amounts of solvent will be employed. The concentration of the polyester resin in the treating solution will also depend on the article being treated. For instance, where vertical surfaces, e.g., the sides of a cup, are being treated, relatively high viscosities are desirable, whereas for other applications where the treating solution would be less likely to run or sag, lower viscosities can be tolerated. Finally, in the case of organic solutions, the viscosity will depend on the particular solvent chosen, inasmuch as various solvents will give solutions having different viscosities, even where the concentration of the polyester resin in such solutions remains the same. In general, however, an aqueous solution of the polyester resin will have a resin solids content ranging from about 5% to about 80% by weight, and preferably from about 50% to about 75% by weight, based on the total weight of the solution. A solution of the polyester resin in an inert organic solvent can also have a resin solids content ranging from about 5% to about 80% by weight, again based on the total weight of the solution.

The thickness of the coating of the stain-retarding composition applied to the surface of the heat- and pressure-consolidated aminoplast resin article is not critical, so long as any part of the surface which is to be rendered stain retardant is covered with the composition.

Following the application of the composition to the article, the coated article can, if desired, be allowed to air dry at room temperature for several hours before being heat-treated. However, the wet, coated article will usually be heat-treated immediately after being coated, using any temperature high enough to drive off the solvent and ultimately render the polyester resin substantially tack-free without affecting the aminoplast resin article itself. Preferably, temperatures ranging from about 120° C. to about 160° C. will be employed and, under these conditions, the heat-treatment will usually take from about 20 minutes to about one hour.

While we do not wish to be bound by any theory advanced to explain the operation of our invention, we believe that the beneficial improvement in stain-resistance resulting from the use of the above-described polyester resins may possibly be derived from the reaction, during the heat-treatment, of the free carboxyl groups contained in the resin with certain basic reactive sites or groups of atoms present on the surface of the heat- and pressure-consolidated aminoplast resin article being treated. These sites or groups of atoms, which apparently remain chemically active, and thus susceptible to attack by stain-producing agents, despite the fact that the article has undergone a high temperature-high pressure curing cycle, are believed to be inactivated by reaction with our stain-retarding compositions.

As a result of the heat-treatment, the polyester resin is generally converted to a hard, brittle, solid coating, and it is probable that the resin undergoes a certain amount of cross-linking as a result of the heat-treatment. Nevertheless, the non-adhering portion of the coating, i.e., that portion which perhaps has not reacted with reactive sites on the surface of the aminoplast resin article, is easily removable by washing. Either water or one of the above-mentioned inert organic solvents can be used. Removal of the non-adhering polyester resin is facilitated by the use of hot solvents. Thus, water will preferably be used at a temperature of from about 70° C. to 100° C. The inert organic solvents will also be used hot, if desired, e.g., at or near their boiling points, to speed up removal of the coating.

Thermosetting aminoplast resins of the type employed in the manufacture of the heat- and pressure-consolidated articles treated in accordance with the practice of the present invention are synthetic resins prepared by the condensation reaction of an amino (including imino) or amido (including imido) compound with an aldehyde. Resinous condensates of this type, as well as methods for their preparation, have been shown innumerable times in the prior art, and adequate disclosures of them may be found in, for example, U.S. Patents Nos. 2,197,357; 2,310,004 and 2,328,592 to Widmer et al. and 2,260,239 to Talbot. The present invention is concerned particularly with the treatment of molded and laminated articles prepared from aminoplast resins of the type wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are treated according to the practice of the present invention, but other aminotriazines, e.g., mono-, di- and tri-substituted melamines, such as the mono-, di- and trimethylmelamines, and the like, or guanamines, such as formoguanamine, acetoguanamine, benzoguanamine, and the like, may be utilized as reactants with any suitable aldehyde in preparing the aminotriazine-aldehyde resinous reaction product. Similarly, formaldehyde, preferably in aqueous solution, is the preferred aldehyde reactants, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finished product and economic considerations are among the elements which will determine the choice of the particular aminotriazine and aldehyde employed.

The mol ratio of aldehyde to aminotriazine in such resinous reaction products is not critical, and may be within the order of from about 1.5:1 to about 4:1, respectively, depending on the nature of the starting materials and the characteristics desired in the final product, but it is preferred that the mol ratio be within the order of from about 2:1 to about 3:1, respectively. Similarly, the reaction conditions conventionally employed in preparing these resinous reaction products can be varied to a considerable extent, e.g., the aldehyde and aminotriazine may be heat-reacted at temperatures ranging from about 40° C. to reflux temperature, i.e., about 100° C., for periods of time ranging from about 30 to 120 minutes, at a pH ranging from about 6.5 to 10, either by themselves or in an aqueous medium.

Other amido or imido compounds besides the aminotriazines may also be employed in preparing the thermosetting aminoplast resins used in the heat- and pressure-consolidated articles treated in accordance with the present invention. Among them there are included urea and those of its derivatives having at least one aldehyde-reactable hydrogen atom which have been commonly used in the preparation of aminoplast resinous compositions, such as for example the alkylureas, e.g., mono- and dimethylurea, haloureas, and the like.

The various processes for the preparation of heat- and pressure-consolidated molded and laminated articles from aminoplast resinous compositions are so well known in the art that no further mention need be made of them here, except to say that aminoplast resinous compositions may be used with any conventional material, e.g., α-cellulose paper, cellulosic fabrics, silk, glass cloth, rayon, nylon, or other synthetic fabrics, and the like, in the preparation of laminates and also that aminoplast resinous compositions may have incorporated therewith for molding purposes conventional fillers, such as α-cellulose, regenerated cellulose, or other cellulosic fibers, glass or other synthetic fibers, asbestos, mica, sand, ground cork, and the like, mold lubricants, such as zinc stearate, glyceryl monostearate, and the like, and curing catalysts, such as phthalic anhydride, p-toluenesulfonic acid, benzenesulfonic acid, and the like.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

PREPARATION OF RESIN A

To a suitable reaction vessel equipped with a thermometer, mechanical stirrer, reflux condenser and inert gas inlet tube there were charged, with stirring, 246 parts of 1,2,3,4-cyclopentanetetracarboxylic acid, 136 parts of pentaerythritol and 190 parts of water. The resulting homogeneous reaction mixture, with nitrogen gas, added through the inert gas inlet tube, passing beneath its surface to provide an inert atmosphere, was heated to reflux, with stirring, and held at that temperature for approximately 12 hours. At this point, the reflux condenser was replaced by a distillation column and 52 parts of water were distilled off, leaving a clear, liquid polyester resin solution having an acid number of 252, a resin solids content of about 77.6%, based on the total weight of the solution, and a viscosity of 6.27 poises (Gardner-Holdt bubble viscometer).

PREPARATION OF RESINS B–M

In each case, the procedure employed in preparing Resin A was repeated in every essential detail except for the following. The amount of water added initially and/or distilled off at the end of the reaction was varied, in some cases, depending on the viscosity desired in the final aqueous polyester resin solution. The changes in reactants or in amounts of reactants are noted in Table I below. The acid number and viscosity of the resulting aqueous polyester resin solutions are also given in Table I.

TABLE I

| Resin | Acid | Amount of Acid [1] | Polyol | Amount of Polyol [1] | Polyester Resin | |
|---|---|---|---|---|---|---|
| | | | | | Acid No. | Viscosity [2] |
| B | 1,2,3,4-cyclopentanetetracarboxylic acid | 295.5 | Pentaerythritol | 136 | 284 | 2.84 |
| C | ___do___ | 369 | ___do___ | 136 | 308 | 3.60 |
| D | 1,2,3,4-cyclopentanetetracarboxylic acid dianhydride | 210 | ___do___ | 136 | 284 | 2.84 |
| E | 1,2,3,4-cyclopentanetetracarboxylic acid | 246 | ___do___ | 163.5 | 210 | 2.84 |
| F | 1,2,3,4-cyclobutanetetracarboxyli cacid | 232 | ___do___ | 136 | 275 | 4.52 |
| G | 1,2,3,4-cyclobutanetetracarboxylic acid dianhydride | 196 | ___do___ | 136 | 277 | 4.86 |
| H | 1,2,3,4-cyclohexanetetracarboxylic acid | 260 | ___do___ | 136 | 280 | 6.02 |
| I | 1,2,3,4-cyclopentanetetracarboxylic acid | 246 | Ethylene glycol | 124 | 277 | 1.60 |
| J | ___do___ | 246 | 2,2-diethylpropane-diol-1,3 | 264 | 214 | 2.24 |
| K | 1,2,3,4-cyclopentanetetracarboxylic acid | 246 | Butanediol-1,3 | 92 | 265 | 1.70 |
| L | ___do___ | 246 | Glycerol | 109.3 | 333 | 5.25 |
| M | ___do___ | 246 | Triethanolamine | 195.4 | 270 | 3.54 |

[1] In parts by weight.
[2] In poises.

PREPARATION OF RESIN N

A portion of Resin A was charged to a vacuum distillation apparatus and distilled at room temperature (about 25° C.) under a pressure of about 20–25 mm. Hg until a substantially dehydrated, ungelled, liquid polyester resin was obtained. This resin was then admixed with dioxane to give a solution having a resin solids content of 50%, based on the total weight of the solution.

*Example I*

A clean white coffee cup, molded from a commercially available α-cellulose-filled thermosetting melamine-formaldehyde resin molding composition (mol ratio, formaldehyde: melamine, of 2:1, respectively), was brush coated with Resin A to give a continuous coating over the entire surface of the cup. Next, the wet, coated cup was baked in a forced circulation hot air oven at 150° C. for 30 minutes. Finally, the heat-treated cup, after cooling to room temperature, was immersed in water heated to 70° C. After a few minutes in the hot water, the non-adhering portion of the polyester resin coating peeled off, leaving the cup seemingly unchanged as compared to its untreated state.

In order to demonstrate the coffee stain-resistance of the treated cup, the following accelerated coffee-staining test was carried out. A strong brew of black coffee was prepared by dissolving 32 grams of a commercially available instant coffee in one liter of boiling water. The resulting coffee solution was then cooled to 80° C., and the treated cup, together with an identically molded but untreated white control cup, was immersed therein for 100 hours. At the end of the immersion period, both cups were removed from the coffee solution, washed with soap and water, and dried. The treated cup showed no staining, whereas the untreated cup had become heavily stained and dark drown in color.

*Examples II–XIII*

The procedure employed in Example 1 was repeated in every detail except for the following. Resins B through M, respectively, were used in place of Resin A, and in some cases the coating was applied by spraying or dip coating rather than by brush. The resulting treated cups were far superior in resistance to coffee staining as compared to an untreated cup, inasmuch as the treated cups withstood staining for periods of time ranging from 40 to 100 hours when subjected to the accelerated coffee staining test described in Example I, whereas untreated cups became heavily stained after only 6–16 hours immersion in the coffee solution.

*Example XIV*

The procedure of Example I was again repeated in every detail except for the following. The cup employed was a clean, white coffee cup molded from a commercially available α-cellulose-filled thermosetting urea-formaldehyde resin molding composition (mol ratio, formaldehyde:urea, of 1.33:1, respectively). In addition, Resin N was used instead of Resin A. Finally, the baked, coated cup was washed with dioxane heated to 101° C. to remove the non-adhering portion of the polyester resin coating. The thus-treated cup was far superior in coffee stain-resistance as compared to a similarly molded but untreated cup when subjected to the accelerated coffee staining test described in Example I above.

*Example XV*

A white melamine-formaldehyde molded coffee cup treated with Resin A as described in Example I above to render its surfaces stain resistant was immersed for 200 hours in a 2% aqueous sodium hypochlorite solution held at 60° C. At the end of this time, the cup was unchanged from its original appearance. In contrast to this, a similarly molded but untreated white cup became quite yellow after only 24 hours' immersion at 60° C. in the hypochlorite solution.

It will be obvious to those skilled in the art that other changes and variations can be made in carrying out the present invention without departing from the spirit and scope thereof as defined in the appended claims.

We claim:

1. A method of imparting stain resistance to a heat- and pressure-consolidated aminoplast resin-containing article which comprises:
   (1) coating said article directly with a composition comprising a liquid polyester resin prepared by reacting a cycloaliphatic tetracarboxylic acid with a polyhydric alcohol containing at least two hydroxyl groups, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

2. A method of imparting stain resistance to a heat- and pressure-consolidated melamine-formaldehyde resin-containing article which comprises:
   (1) coating said article directly with a composition comprising a liquid polyester resin prepared by reacting a cycloaliphatic tetracarboxylic acid with a polyhydric alcohol containing at least two hydroxyl groups, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

3. A method of imparting stain resistance to a heat- and pressure-consolidated urea-formaldehyde resin-containing article which comprises:
   (1) coating said article directly with a composition comprising a liquid polyester resin prepared by reacting a cycloaliphatic tetracarboxylic acid with a polyhydric alcohol containing at least two hydroxyl groups, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

4. A method of imparting stain resistance to a heat- and pressure-consolidated aminoplast resin-containing article which comprises:
   (1) coating said article directly with a composition comprising a liquid polyester resin prepared by reacting a cycloaliphatic tetracarboxylic acid wherein the cycloaliphatic ring contains from 4 to 6 carbon atoms, inclusive, with a polyhydric alcohol containing from 2 to 6 hydroxyl groups, inclusive, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

5. A method of imparting stain resistance to a heat- and pressure-consolidated melamine-formaldehyde resin-containing article which comprises:
   (1) coating said article directly with a composition comprising a liquid polyester resin prepared by reacting a cycloaliphatic tetracarboxylic acid wherein the cycloaliphatic ring contains from 4 to 6 carbon atoms, inclusive, with a polyhydric alcohol containing from 2 to 6 hydroxyl groups, inclusive, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

6. A method of imparting stain resistance to a heat- and pressure-consolidated urea-formaldehyde resin-containing article which comprises:
   (1) coating said article directly with a composition comprising a liquid polyester resin prepared by reacting a cycloaliphatic tetracarboxylic acid wherein the cycloaliphatic ring contains from 4 to 6 carbon atoms, inclusive, with a polyhydric alcohol containing from 2 to 6 hydroxyl groups, inclusive, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

7. A method of imparting stain resistance to a heat- and pressure-consolidated melamine-formaldehyde resin-containing article which comprises:
   (1) coating said article directly with a composition comprising a liquid polyester resin prepared by reacting 1,2,3,4-cyclopentanetetracarboxylic acid with pentaerythritol, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

8. A method of imparting stain resistance to a heat- and pressure-consolidated urea-formaldehyde resin-containing article which comprises:
   (1) coating said article directly with a composition comprising a liquid polyester resin prepared by reacting 1,2,3,4-cyclopentanetetracarboxylic acid with pentaerythritol, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

9. A method of imparting stain resistance to a heat- and pressure-consolidated melamine-formaldehyde resin-containing article which comprises:
   (1) coating said article directly with a composition comprising a liquid polyester resin prepared by reacting 1,2,3,4-cyclopentanetetracarboxylic acid dianhydride with pentaerythritol, said polyester resin having an acid number of from about 100 to about 350,
   (2) heat-treating the resulting coated article to convert said polyester resin coating to a tack-free film, and
   (3) washing the resulting heat-treated article to remove the non-adhering portion of said polyester resin film.

10. A method of imparting stain resistance to a heat- and pressure-consolidated urea-formaldehyde resin-containing article which comprises:
    (1) coating said article directly with a composition comprising a liquid polyester resin prepared by reacting 1,2,3,4-cyclopentanetetracarboxylic acid dianhydride with pentaerythritol, said polyester resin having an acid number of from about 100 to about 350,
    (2) heat-treating the resulting coated article to convert said polyester resin coating to a tack-free film, and
    (3) washing the resulting heat-treated article to remove the non-adhering portion of said polyester resin film.

11. A stain-resistant heat- and pressure-consolidated aminoplast resin-containing article prepared according to the process of claim 1.

12. A stain-resistant heat- and pressure-consolidated melamine-formaldehyde resin-containing article prepared according to the process of claim 9.

13. A stain-resistant heat- and pressure-consolidated urea-formaldehyde resin-containing article prepared according to the process of claim 10.

References Cited by the Examiner

UNITED STATES PATENTS

| 3,021,308 | 2/62 | Caywood et al. | 260—75 |
| 3,111,420 | 11/63 | Boenig et al. | 117—138.8 XR |

WILLIAM D. MARTIN, *Primary Examiner.*

RICHARD D. NEVIUS, *Examiner.*

UNITED STATES PATENT OFFICE
CERTIFICATE OF CORRECTION

Patent No. 3,215,553 November 2, 1965

Aleksandra C. Nawakowski et al.

It is hereby certified that error appears in the above numbered patent requiring correction and that the said Letters Patent should read as corrected below.

Column 2, lines 40 and 41, for "1,2,3,4-cyclopentanetetracorboxylic acid" read -- 1,2,3,4-cyclopentanetetracarboxylic acid --; line 50, for "similarly" read -- Similarly --; column 3, line 8, for "sorbital" read -- sorbitol --; columns 7 and 8, TABLE I, opposite "F" for "1,2,3,4-cyclobutanetetracarboxyli cacid" read -- 1,2,3,4-cyclobutanetetracarboxylic acid --.

Signed and sealed this 16th day of August 1966.

(SEAL)
Attest:

ERNEST W. SWIDER
Attesting Officer

EDWARD J. BRENNER
Commissioner of Patents